United States Patent
Mahany

(10) Patent No.: US 7,418,157 B1
(45) Date of Patent: Aug. 26, 2008

(54) OPTICAL INDICIA READING VIA APPLICATION OF MULTIPLE TRANSFORMS

(75) Inventor: Richard J. Mahany, Mt. Vernon, IA (US)

(73) Assignee: Intermec IP Corp., Everett, WA (US)

( * ) Notice: Subject to any disclaimer, the term of this patent is extended or adjusted under 35 U.S.C. 154(b) by 722 days.

(21) Appl. No.: 10/909,850

(22) Filed: Aug. 2, 2004

Related U.S. Application Data

(60) Provisional application No. 60/492,124, filed on Aug. 1, 2003.

(51) Int. Cl.
*G06K 9/36* (2006.01)
(52) U.S. Cl. .................................................. 382/276
(58) Field of Classification Search ................ 382/141, 382/299, 248; 235/462.1–462.25
See application file for complete search history.

(56) References Cited

U.S. PATENT DOCUMENTS

| | | | |
|---|---|---|---|
| 5,537,669 A | * | 7/1996 | Evans et al. .................. 382/141 |
| 5,943,170 A | * | 8/1999 | Inbar et al. .................. 359/561 |
| 7,003,177 B1 | * | 2/2006 | Mendlovic et al. .......... 382/299 |
| 2004/0114822 A1 | * | 6/2004 | Tabesh et al. ................ 382/248 |

OTHER PUBLICATIONS

Karhunen-Leove Multispectral Image restoration, B.R. Hunt, IEEE 0096-3518/84/0600-0592—1984.*

* cited by examiner

*Primary Examiner*—Jayesh A Patel
(74) *Attorney, Agent, or Firm*—Shook, Hardy & Bacon L.L.P.

(57) ABSTRACT

A method for reading optical indicia involving the application of different symmetrical transforms to each of a plurality of images of an optical indicia. Characteristic features are identified in the transformed frequency domain representation of each transformed image, the characteristic features corresponding to repetitive features found in the original non-transformed representation of each image. Modified images are created by subjecting the frequency-domain representation of each image to an inverse transformation. The modified images can be combined to create an improved representation of the optical indicia being read. Thus, the depth of field and efficiency of an optical indicia reader can be enhanced.

21 Claims, 2 Drawing Sheets

OPTICAL INDICIA READING VIA APPLICATION OF MULTIPLE TRANSFORMS

CROSS REFERENCE TO RELATED APPLICATION AND INCORPORATION BY REFERENCE

This application claims the benefit, pursuant to 35 U.S.C. §119(e), of U.S. Provisional Application No. 60/492,124, filed Aug. 1, 2003. The entire specification of U.S. Provisional Application No. 60/492,124, filed Aug. 1, 2003, including all text and drawing figures is hereby incorporated herein by this reference.

BACKGROUND OF THE INVENTION

1. Field of the Invention

The present invention generally pertains to the optical imaging arts. Further, the present invention pertains to an improved system for reading optical indicia.

2. Description of Related Art

Devices have been developed that can read optical indicia without coming into physical contact with the particular optical indicia being read. Such reading or imaging devices are said to read in an "non-contact" fashion. Portable and non-portable such devices are known.

The reading devices capture an image of the indicia by sensing light-energy reflected from the indicia to the reading device. Such optical indicia readers illuminate the optical indicia by directing or scanning a light-energy source, such as a laser-generated or other type of light, across the surface of the indicia. Other types of reading devices are sometimes referred to as "instantaneous" readers. These readers generally illuminate the entire optical indicia at once and sense the reflected light energy with an area-type sensor.

All types of optical indicia readers, however, often capture an image of an optical indicia that turns out to be unreadable. The unreadability can be the result of several factors. Sometimes, for example, the reader is not accurately aimed and a sufficient portion of the optical indicia is not within the captured field of view. Sometimes the light-energy reflected back to the reader is not sufficient to permit a quality imaging. Other factors can also cause a captured field of view to be unreadable. As a final example, if the optical indicia is not located within the indicia reader's depth of field, if the indicia is too far from the reader for example, the captured image will be too out of focus to be readable.

Past indicia readers have incorporated some features calculated to increase reading performance. For example, some readers employ filtering technology in the time or spatial domain to remove some problems. Some readers have used a Fourier transformation to aid the reading process. If, however, a filtered or Fourier transformed image is not readable, the reading process must start over and a new image must be acquired.

What is needed is an improved indicia reading system that can read images that would have been unreadable with previous systems. Such a capability would improve efficiency since fewer optical indicia would have to be reread.

SUMMARY OF THE INVENTION

The present invention provides an improvement in optical indicia reading systems. The system achieves its objective by using multiple images of the same field of view. Two or more symmetrical transforms are then applied to the images. Characteristic features are identified in the frequency domain. An inverse transform is then applied to create modified representations of the optical indicia being read. The various modified representations are then compared and they are combined to create an improved representation of the optical indicia.

Other embodiments, aspects, advantages and novel features of the present invention will become apparent from the following detailed description of the invention when considered in conjunction with the accompanying drawings and claims.

BRIEF DESCRIPTION OF THE DRAWINGS

The invention may be more fully understood by reading the following detailed description of the embodiments of the invention, in conjunction with the appended drawings, wherein.

DETAILED DESCRIPTION

The present invention can be practiced with a wide variety of optical indicia readers. It will be appreciated that the present invention can be used with hand-held, portable, and stationary (non-handheld) optical readers. It can be used with scanning-style (laser and non-laser) readers as well as instantaneous or area-type optical readers. It is envisioned that many later-developed indicia readers will also be able to use this invention. The main requirements of the reading system being that it have sufficient processing capability and memory resources to perform the disclosed algorithms.

Figure 1:
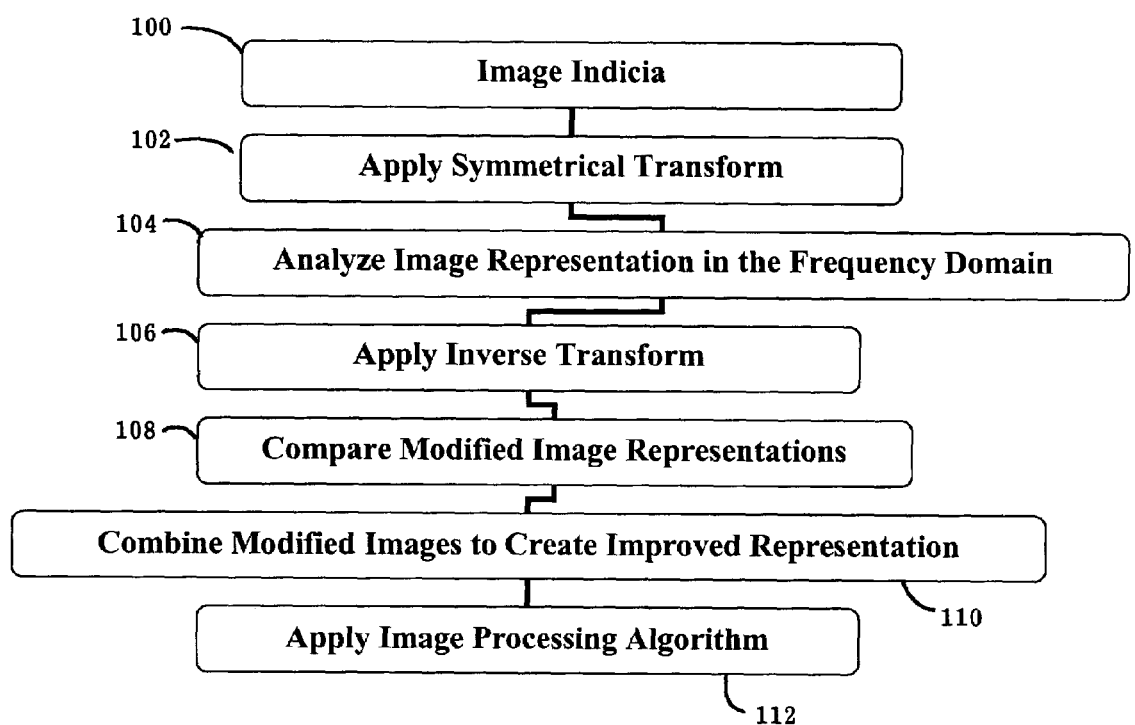
FIG. 1 depicts a flowchart outlining steps that can be carried out in practicing the invention.

FIG. 1 depicts a flowchart outlining steps that can be carried out in practicing the invention. First, multiple images of the same field of view, a field of view containing an optical indicia for example, are captured 100. The optical indicia can be any of a wide variety of such indicia. For example, the optical indicia can be a 1D or a 2D code or some other type of optical indicia. Optical indicia are well known in the art and will not be discussed here further.

Figure 2:
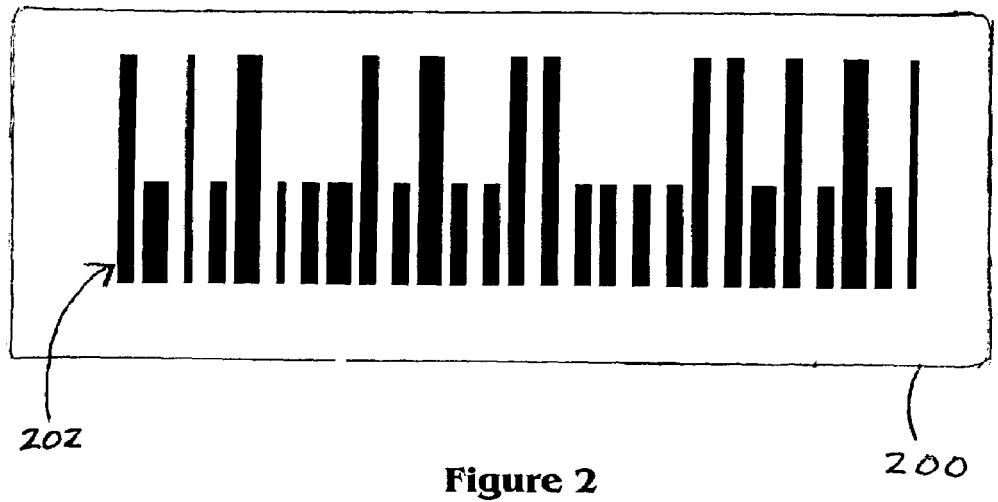
FIG. 2 depicts an optical indicia located within the field of view of an optical indicia reader.

FIG. 2 depicts a field of view 200 including an optical indicia 202. In FIG. 2, the optical indicia is depicted as a 1D bar code. The choice of a 1D bar code for FIG. 2 is for demonstration purposes only and should not be construed to limit the invention to the scanning of 1D codes. As explained, a wide-variety of codes can be read with the present invention. The field of view 200 can be captured, for example, by a scanning or an instantaneous type reader.

Figure 3:
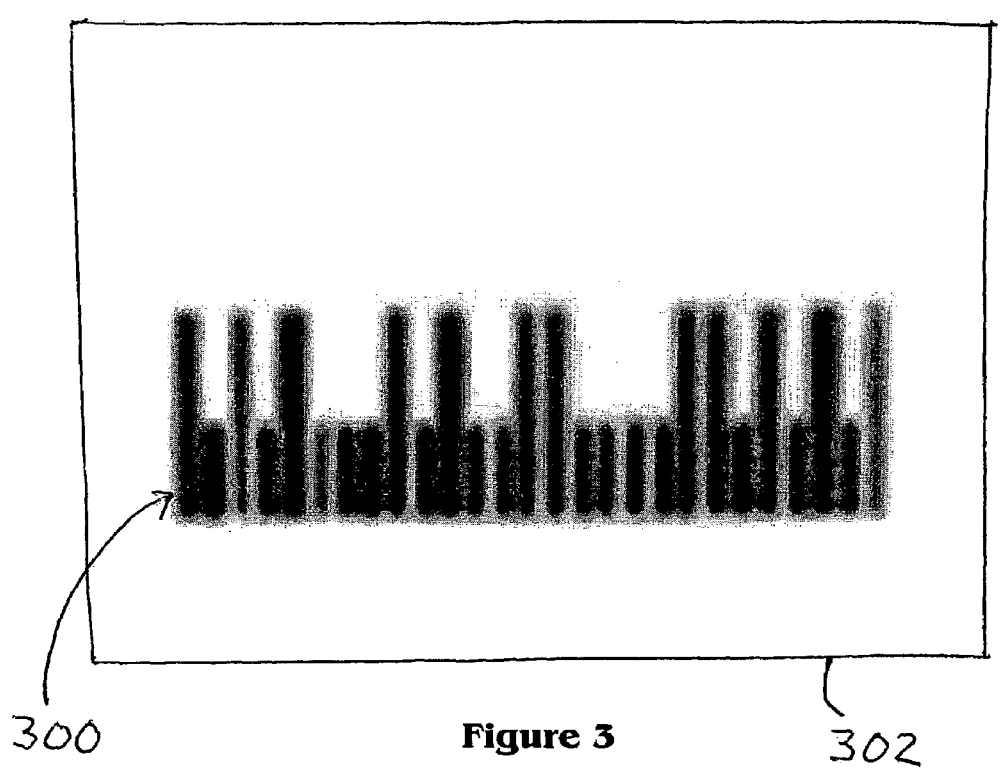
FIG. 3 depicts an image of an optical indicia that has been captured by an optical indicia reader.

When an optical indicia, the indicia indicated in FIG. 2 for example, is captured but is not within the reader's depth of field, the captured image may be significantly distorted. FIG. 3 depicts one example of an image 300 captured when the field of view 302 is located outside of the reader's depth of field at the time of image capture. In this figure, the captured optical indicia 300 appears diffuse and out-of-focus. The image lacks the sharp black-to-white transitions of the actual indicia (see 202, FIG. 2). The present invention, however, can convert a captured image that would otherwise be unreadable into a readable image representation. Thus, the need for a second or further imagings is eliminated.

Referring again to FIG. 1, multiple images of the optical indicia should be captured or created 100. The multiple images can be captured in quick succession due to the quick reading rates of many scanning and instantaneous readers.

The number of images to be captured 100 will be a function of the resources of the reader and the expected reading conditions and parameters. The chances of obtaining a readable representation of an indicia increase when a greater number of images of the indicia are captured and processed.

The multiple images of the indicia are stored in memory in some suitable manner so as to permit them to be readily accessed and processed. In one embodiment, the multiple indicia images are sequentially connected together to form a single, integrated image of extended length. Other structures or relationships can alternatively be employed.

Next, a symmetrical transform is applied 102 to each indicia image to be processed. More than one transform is used. For example, if two images of an indicia are to be processed, each is subjected to a different symmetrical transform. If three indicia images are to be processed, three different transforms are applied: one transform for each indicia image to be processed. When more indicia images are to be processed, an equivalent number of transforms is used.

The symmetrical transform is applied to transform the indicia image from the time or spatial domain to the frequency domain. Several different symmetrical transforms are available for this purpose. For example, the transform can be a Fourier transform, a Karhunen-Loeve transform, or any of a multitude of Wavelet transforms.

The two-dimensional discrete Fourier transform pair for an N×N array of pixels f(x, y), x, y=0, 2, ..., N−1 is given by the following equations:

$$f(x, y) = \sum_{u=0}^{N-1} \sum_{v=0}^{N-1} F(u, v) \exp\left[\frac{j2\pi(ux+vy)}{N}\right] \text{ and}$$

$$F(u, v) = \frac{1}{N} \sum_{x=0}^{N-1} \sum_{y=0}^{N-1} f(x, y) \exp\left[\frac{-j2\pi(ux+vy)}{N}\right]$$

where u, v=0, 2, ..., N−1.

The Wavelet transform decomposes signals over dilated and translated wavelets. A wavelet is a finite energy function ψ, $$\int |\psi(t)|^2 dt < \infty$$

with a zero average:

$$\int_{-\infty}^{\infty} \psi(t) dt = 0.$$

It is normalized $$\|\psi(t)\|=1$$

and centered in the neighborhood of t=0.

The ψ function can be any of a variety of different functions. Much work in this area has been done by Daubechies. Several functions that can be used for the ψ function are disclosed in I. Daubechies, *Orthonormal Bases of Compactly Supported Wavelets,* Comm. Pure & Appl. Math. 41, pp. 909-996 (1988), and I. Daubechies, *The Wavelet Transform, Time-Frequency Localization and Signal Analysis,* IEEE Trans. Inf. Theory 36, pp. 961-1005 (1990). The entire content of I. Daubechies, *Orthonormal Bases of Compactly Supported Wavelets,* Comm. Pure & Appl. Math. 41, pp. 909-996 (1988), and I. Daubechies, *The Wavelet Transform, Time-Frequency Localization and Signal Analysis,* IEEE Trans. Inf. Theory 36, pp. 961-1005 (1990), including all text, drawings and appendices, is hereby incorporated herein by this reference.

Thus, when applying the symmetrical transforms 102, two or more Wavelet transforms, each having a different ψ function, can be used. Each different Wavelet transform being applied 102 to a different indicia image 100. Further, one or both of the Fourier and Karhunen-Loeve transforms can be used in conjunction with one or more different Wavelet functions in the step of applying the symmetrical transforms 102.

A family of time-frequency atoms is obtained by scaling ψ by s and translating by u;

$$\psi_{u,s}(t) = \frac{1}{\sqrt{s}} \psi\left(\frac{t-u}{s}\right)$$

A formal definition of the Wavelet transform of the signal f at time u and scale s is as follows:

$$Wf(u, s) = \langle f, \psi_{u,s} \rangle = \int_{-\infty}^{\infty} f(t) \frac{1}{\sqrt{s}} \psi^*\left(\frac{t-u}{s}\right) dt \text{ and}$$

$$f = \sum_{u=-\infty}^{\infty} \sum_{s=-\infty}^{\infty} \langle f, \psi_{u,s} \rangle \psi_{u,s}$$

Since ψ(t) has a zero average, each partial sum $$g_s = \sum_{u=-\infty}^{\infty} \langle f, \psi_{u,s} \rangle \psi_{u,s}$$

can be interpreted as detail variation at the scale s. These detail variations are added at all scales to progressively improve the approximation of the signal f, and at the limit to fully reconstruct f.

After being transformed from the time or spatial domain to the frequency domain by application of the symmetrical transforms 102, the transformed image is analyzed 104. In this step, each transformed indicia image is analyzed to identify the special features therein and to "clean up" the image so that it achieves a specific and sufficient prominence. For example, the image can be analyzed so as to identify those characteristic features that correspond to repetitive features present in the time or spatial domain representation of the indicia image.

Next, the appropriate inverse (or reverse) transform is applied to each frequency domain representation 106. Application of the inverse transforms 106 will result in the creation of modified, improved forms of the originally captured indicia images. The plurality of modified image representations can then be used to create a further improved representation of the imaged optical indicia.

The modified representations are next compared 108. One or more of the modified representations of the optical indicia may still contain portions that are not readable. For example, one or more portions of a modified image representation may be absent, obscured or otherwise unreadable. The better quality portions of each modified image representation can be identified. Those portions can then be used to construct the further improved representation of the imaged optical indicia 110. An image processing algorithm can be applied 112 to the improved image representation to initiate the recognition and decoding stages of the reading process.

In a related embodiment of the invention, instead of applying the image processing algorithm to a single improved image representation, an image processing algorithm is applied to each of the modified image representations created by the application of the inverse transformations 106. The appropriate portions of the results obtained by that processing are then selected for decoding and further use.

Thus, even an optical indicia that is not within the depth of field of the reader imaging it, can be processed, improved, reconstructed and read. In effect, the depth of field of the indicia reader has been increased and operational efficiency has been improved.

It will be understood that the instructions for performing the steps disclosed herein can be written in a variety of computer languages. It will be further understood that the instructions can be stored and executed in a variety of ways. If desired, an ASIC can also be used to perform the invention disclosed herein. Also, the computerized processing required to carry out the invention can be performed in same device that is used to capture the optical indicia image. Alternatively, some or all of the required processing can be performed in a different, even remotely located, apparatus.

In addition, the instructions can be supplied to the optical indicia reader via hardware or by media designed to store software. For example, the instructions can be supplied to the system via an internet or network-type connection. Alternatively, the instructions can be delivered via a removable card such as a Compact Flash, SD or other such removable or non-removable card, module or component. Further still, the instructions can be supplied via some magnetic, optical or other type of storage media, removable or non-removable, such as a hard drive, a floppy disk, a CD, a DVD, or other such storage media.

The scope of the present invention is intended to cover all variations, omissions, substitutions and combinations which are and which may become apparent from the disclosed embodiments. The scope of the invention should be extended to the claimed invention and all of its equivalents.

I claim:

1. A method for reading of optical indicia with a computerized image collection device, comprising the steps of:
   capturing a plurality of images from a same field of view containing an optical indicia;
   creating a single extended image from the plurality of captured images wherein the single extended image is the plurality of captured images sequentially connected together;
   applying a first symmetrical transform to a first image of the plurality of images of the single extended image to create a frequency-domain representation of the first image;
   applying a second symmetrical transform to a second image of the plurality of images of the single extended image to create a frequency-domain representation of the second image wherein the second symmetrical transform is different from the first symmetrical transform;
   identifying, in the transformed frequency domain representation of each transformed image, characteristic features that correspond to repetitive features found in the original non-transformed representation of each image wherein the original non-transformed representation is in the time or spatial domain;
   creating a first modified image by subjecting the frequency-domain representation of the first image to a first inverse transformation;
   creating a second modified image by subjecting the frequency-domain representation of the second image to a second inverse transformation; and
   combining the first modified image and the second modified image to create an improved representation of the optical indicia wherein combining the first modified image and the second modified image comprises identifying better quality portions of the first modified image and the second modified image and constructing from the better quality portions the improved representation of the optical indicia.

2. The method of claim 1, further comprising the step of determining the structure of the optical indicia by analyzing the improved representation of the optical indicia.

3. The method of claim 2, wherein said determining step comprises processing the improved representation of the optical indicia with an image processing algorithm.

4. The method of claim 1, wherein the first symmetrical transform comprises a Fourier transformation.

5. The method of claim 4, wherein the second symmetrical transform comprises a Wavelet transformation.

6. The method of claim 4, wherein the second symmetrical transform comprises a Karhunen-Loeve transformation.

7. The method of claim 1, wherein the first symmetrical transform comprises a Wavelet transformation.

8. The method of claim 7, wherein the second symmetrical transform comprises a Karhunen-Loeve transformation.

9. A method for reading optical indicia, comprising the steps of:
   creating a plurality of images from a same field of view containing an optical indicia;
   applying a first symmetrical transform to a first image of the plurality of images to create a frequency-domain representation of the first image;
   applying a second symmetrical transform to a second image of the plurality of images to create a frequency-domain representation of the second image wherein the second symmetrical transform is different from the first symmetrical transform;
   identifying, in the transformed frequency domain representation of each transformed image, characteristic features that correspond to repetitive features found in the original non-transformed representation of each image wherein the original non-transformed representation is in the time or spatial domain;
   creating a first modified image by subjecting the frequency-domain representation of the first image to a first inverse transformation;
   creating a second modified image by subjecting the frequency-domain representation of the second image to a second inverse transformation; and
   combining the first modified image and the second modified image to create an improved representation of the optical indicia wherein combining the first modified image and the second modified image comprises identifying better quality portions of the first modified image and the second modified image and constructing from the better quality portions the improved representation of the optical indicia.

10. The method of claim 9, wherein the first symmetrical transform comprises a Fourier transformation.

11. The method of claim 10, wherein the second symmetrical transform comprises a Wavelet transformation.

12. The method of claim 10, wherein the second symmetrical transform comprises a Karhunen-Loeve transformation.

13. The method of claim 9, wherein the first symmetrical transform comprises a Wavelet transformation.

14. The method of claim 13, wherein the second symmetrical transform comprises a Karhunen-Loeve transformation.

15. A method for reading optical indicia, comprising the steps of:
- applying a first symmetrical transform to a first image of the optical indicia being read to create a frequency-domain representation of the first image;
- applying a second symmetrical transform to a second image of the optical indicia being read to create a frequency-domain representation of the second image wherein the second symmetrical transform is different from the first symmetrical transform;
- identifying, in the transformed frequency domain representation of each transformed image, characteristic features that correspond to repetitive features found in the original non-transformed representation of each image wherein the original non-transformed representation is in the time or spatial domain;
- creating a first modified image by subjecting the frequency-domain representation of the first image to a first inverse transformation;
- creating a second modified image by subjecting the frequency-domain representation of the second image to a second inverse transformation; and
- combining the first modified image and the second modified image to create an improved representation of the optical indicia being read wherein combining the first modified image and the second modified image comprises identifying better quality portions of the first modified image and the second modified image and constructing from the better quality portions the improved representation of the optical indicia.

16. The method of claim 15, wherein the first symmetrical transform comprises a Fourier transformation.

17. The method of claim 16, wherein the second symmetrical transform comprises a Wavelet transformation.

18. The method of claim 16, wherein the second symmetrical transform comprises a Karhunen-Loeve transformation.

19. The method of claim 15, wherein the first symmetrical transform comprises a Wavelet transformation.

20. The method of claim 19, wherein the second symmetrical transform comprises a Karhunen-Loeve transformation.

21. A method for reading optical indicia, comprising the steps of:
- applying a first symmetrical transform to a first image of the optical indicia being read, to create a frequency-domain representation of the first image;
- applying a second symmetrical transform to a second image of the optical indicia being read, to create a frequency-domain representation of the second image wherein the second symmetrical transform is different from the first symmetrical transform;
- identifying, in the transformed frequency domain representation of each transformed image, characteristic features that correspond to repetitive features found in the original non-transformed representation of each image wherein the original non-transformed representation is in the time or spatial domain;
- creating a first modified image by subjecting the frequency-domain representation of the first image to a first inverse transformation;
- creating a second modified image by subjecting the frequency-domain representation of the second image to a second inverse transformation; and
- processing the first modified image and the second modified image with an image processing algorithm wherein processing the first modified image and the second modified image comprises initiating a recognition and a decoding of the first modified image and the second modified image.

* * * * *